US008785861B2

(12) United States Patent
Ruh (10) Patent No.: US 8,785,861 B2
(45) Date of Patent: Jul. 22, 2014

(54) CONTROLLING PCB GLASS FIBER ORIENTATION TO LIMIT CROSSTALK IN A SENSOR MODULE

(71) Applicant: Apple Inc., Cupertino, CA (US)

(72) Inventor: Richard Ruh, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/712,003

(22) Filed: Dec. 12, 2012

(65) Prior Publication Data

US 2014/0158889 A1 Jun. 12, 2014

(51) Int. Cl.
*G01J 5/02* (2006.01)
(52) U.S. Cl.
CPC .......................................... *G01J 5/02* (2013.01)
USPC .......................................................... 250/353
(58) Field of Classification Search
CPC .............................................................. G01J 5/02
USPC .................................... 250/353, 338.1, 338.4
See application file for complete search history.

(56) References Cited

U.S. PATENT DOCUMENTS

| 3,423,594 | A | * | 1/1969 | Galopin | 257/432 |
| 5,374,824 | A | * | 12/1994 | Chaney et al. | 250/363.02 |
| 2008/0128631 | A1 | * | 6/2008 | Suhami | 250/370.09 |
| 2011/0024627 | A1 | | 2/2011 | Yao | |
| 2011/0057108 | A1 | | 3/2011 | Yao et al. | |
| 2012/0132809 | A1 | | 5/2012 | Findlay | |

* cited by examiner

*Primary Examiner* — David Porta
*Assistant Examiner* — Faye Boosalis
(74) *Attorney, Agent, or Firm* — Blakely, Sokoloff, Taylor & Zafman LLP (57) ABSTRACT

A proximity sensing device having a light emitting assembly including a light emitting device for proximity sensing positioned on a substrate and a light emitting lens positioned along a side of the light emitting device opposite the substrate and a light receiving assembly having a light receiving device positioned on the substrate and a receiving lens positioned along a side of the light receiving device opposite the substrate. A mid wall is positioned between the light emitting assembly and the light receiving assembly which includes a crosstalk controlling portion positioned between the light emitting lens and the light receiving lens that is configured to reduce optical crosstalk between the light emitting assembly and the light receiving assembly.

16 Claims, 10 Drawing Sheets

CONTROLLING PCB GLASS FIBER ORIENTATION TO LIMIT CROSSTALK IN A SENSOR MODULE

FIELD

An embodiment of the invention is directed to reducing crosstalk within a proximity sensor and detector module. Other embodiments are also described and claimed.

BACKGROUND

Portable handheld electronic devices, such as the iPhone® multifunction device by Apple Inc., have a touch screen in their front face, where an earpiece speaker or receiver used for telephony is located. When the device is being held against the user's ear during a phone call, a proximity function automatically senses this condition using an infrared proximity sensor that is built into the device, and on that basis turns off the touch sensitive display screen of the device. The proximity function can also automatically determine or measure when the device has moved away from the user's ear, in which case the touch screen is re-activated. This is achieved by measuring the signals of the infrared proximity sensor's emitter and complementary detector, where the emitter transmits an infrared signal that is reflected by a nearby object (e.g., the user's head) and picked up by the detector. A stronger received signal may be interpreted by the proximity function to mean that the object is closer, while a weaker received signal means the object is farther away. Since an intensity of the infrared signals are used to determine the proximity of an object, optical crosstalk between the emitter and detector components can result in a false signal, and in turn an inaccurate proximity measurement. In some proximity sensor modules, a wall which serves as a light barrier is placed between the emitter and detector. In some cases, however, crosstalk may still occur through the wall.

SUMMARY

An embodiment of the invention is directed to a proximity sensing device including a light emitting assembly having a light emitting device for proximity sensing positioned on a substrate and a light emitting lens positioned along a side of the light emitting device that is opposite the substrate, the light emitting lens capable of transmitting or directing light from the light emitting device to an ambient environment. The proximity sensing device further including a light receiving assembly having a light receiving device positioned on the substrate and a receiving lens positioned along a side of the light receiving device that is opposite the substrate, the light receiving lens capable of collecting light from the ambient environment and transmitting the light toward the light receiving device. A mid wall may be positioned between the light emitting assembly and the light receiving assembly. The mid wall may include a crosstalk controlling portion positioned between the light emitting lens and the light receiving lens. The crosstalk controlling portion may include a plurality of lengthwise fibers and a plurality of crosswise fibers oriented substantially orthogonal with respect to one another and at a substantially non-orthogonal angle with respect to a lateral axis bisecting the light emitting lens and the light receiving lens so as to reduce optical crosstalk between the light emitting assembly and the light receiving assembly.

In still further embodiments, the substrate may include a material having a plurality of lengthwise fibers and a plurality of crosswise fibers. The fibers of the substrate may be oriented in substantially the same direction as the fibers of the crosstalk controlling portion such that a coefficient of thermal expansion of the substrate and the crosstalk controlling portion are substantially the same. Representatively, in one embodiment, the substrate and the crosstalk controlling portion are made of an FR4 grade glass-reinforced epoxy laminate.

In still further embodiments, the crosswise fibers may have a greater radius of curvature than the lengthwise fibers or vice versa; one or both may be oriented substantially in a direction of the light emitting lens and the light receiving lens. The radius of curvature of the fibers oriented toward the light emitting lens and the light receiving lens may have a radius of curvature sufficient to cause light to leak out of the fibers so as to reduce transmission or leakage of the light between the light emitting lens and the light receiving lens.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, wellknown structures and techniques have not been shown in detail so as not to obscure the understanding of this description.

Figure 1A:
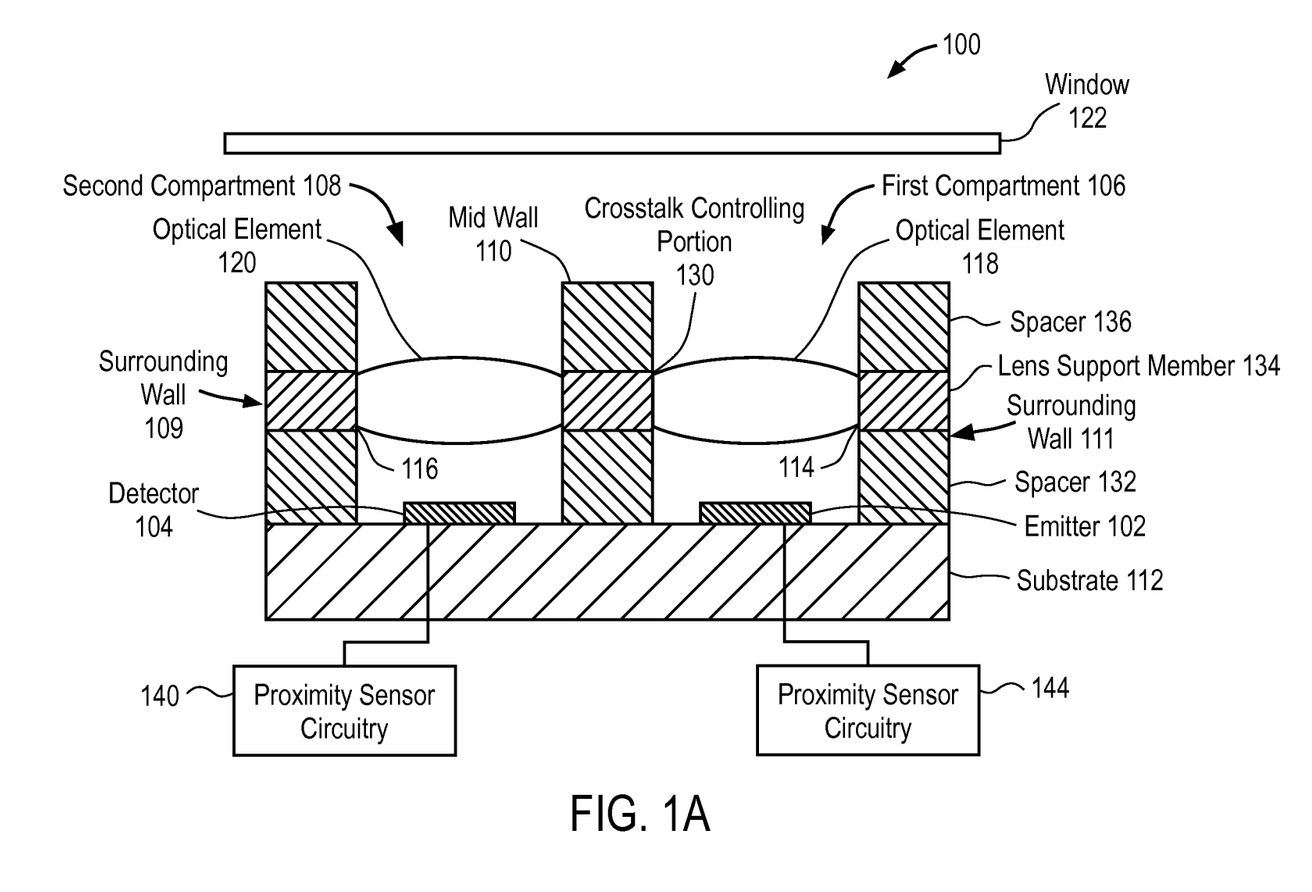
FIG. 1A is a cross-sectional side view of one embodiment of a sensing device.

FIG. 1A is a cross-sectional side view of one embodiment of a proximity sensing device. In one embodiment, sensing device 100 may be a proximity or a proximity and light sensing device. In the latter case, sensing device 100 may be used to both detect a proximity of an object from the device and to detect an intensity of an ambient light surrounding the device. One implementation of this embodiment may use an emitter of infrared (IR) light and a detector of IR light to sense proximity (when sensing IR light from the emitter). The detector may also sense light from sources other than the emitter to provide an ALS function. For example, the detector may sense an intensity of visible light within the environment, such as that from the sun or other indoor/outdoor lighting sources (e.g., light bulbs). Based on the intensity of light sensed, the device within which sensing device 100 is implemented, may modify its operation (e.g., display screen functionality and/or lighting). It is further contemplated, however, that in some embodiments, sensing device 100 has only a proximity sensing functionality.

In the illustrated embodiment, sensing device 100 includes an emitter 102 and a detector 104. The emitter 102 may generate and emit light in, for example, the infrared (IR) bands as previously discussed. For example, emitter 102 may be a semiconductor light source such as a light emitting diode (LED). The detector 104 may be configured to detect changes in the intensity of light emitted from emitter 102 as well as the ambient environment outside of sensing device 100. In this aspect, detector 104 may serve as an ambient light detector as well as a proximity detector. Representatively, detector 104 may be a photodiode or other type of photodetector capable of sensing and converting IR and ambient light into a current or voltage that can then be processed by the device within which it is implemented. Detector 104 may be a single detector or may include more than one detector, for example, one detector configured to detect ambient light and another detector configured to detect IR light.

Emitter 102 may be mounted or formed within a portion of a substrate 112 within a first compartment 106 formed over substrate 112. Detector 104 may be mounted or formed within a portion of substrate 112 within a second compartment 108. In one embodiment, substrate 112 is a printed circuit board (PCB) having traces, wire bond pads and/or vias disposed thereon or therein to facilitate transfer of electrical signals between emitter 102 and detector 104 and the electronic device within which sensing device 100 is implemented. Emitter 102 may also be electrically coupled to proximity sensor circuitry 144 and detector 104 may be electrically coupled to proximity sensor circuitry 140 (and optionally ALS circuitry, not shown). The circuitry may be signal processing circuitry that allows signals associated with the emitter 102 and/or detector 104 to be used by the electronic device to modify its operation (e.g., turn a display screen off).

The first and second compartments 106, 108 may be formed on opposing sides of a mid wall 110. Mid wall 110 extends from a portion of substrate 112 between emitter 102 and detector 104. In this aspect, the first and second compartments 106, 108 may be formed by the shared mid wall 110 and surrounding wall portions 109, 111 extending from substrate 112 and around emitter 102 and detector 104, respectively, to form substantially enclosed compartments which separate emitter 102 from detector 104. Each of mid wall 110 and surrounding wall portions 109, 111 may be formed by a stack up of material layers, one or more of which may help to reduce optical crosstalk between first compartment 106 and second compartment 108, as will be described in more detail below.

Sensing device 100 may further include optical element 118 and optical element 120. Optical elements 118, 120 may be lenses fitted within openings 114, 116 formed within a lens support member 134. Lens support member 134 may form a layer of the stack up used to form walls 109, 110 and 111. Opening 114 may be dimensioned to support optical element 118 over emitter 102 such that light emitted from emitter 102 passes through optical element 118 to the ambient environment. Opening 116 may be dimensioned to support optical element 120 over detector 104 such that light from emitter 102, which is reflected off a nearby object (and in some cases ambient light from the environment), passes through optical element 120 to detector 104. Each optical element 118, 120 may be configured to transmit and refract the incoming or outgoing light beams in the desired direction. For example, in some embodiments, optical elements 118, 120 may be drum lenses which can concentrate the transmitted light and therefore increase the amount of light focused at the nearby object or detector 104. This is particularly advantageous in the case of proximity detection because it can increase proximity detection distances. It is to be understood, however, that although exemplary optical elements are described herein, such features are optional and may be omitted in some embodiments.

In some embodiments, a window 122 may further be positioned over emitter 102 and detector 104. Window 122 may be formed from a translucent or semi-translucent material such that it does not substantially modify the optical characteristics of sensing device 100. Window 122 may be part of sensing device 100 or formed as part of the portable electronic device in which sensing device 100 is implemented.

Returning to the structure of the first compartment 106 and second compartment 108, as previously discussed, the walls (e.g., walls 109-111) which form the compartments may be made by a stack up of different materials, one or more of which may help to reduce optical crosstalk between first compartment 106 and second compartment 108. Optical crosstalk refers to an occurrence in which stray light from an emitter is detected by the detector thereby causing an undesired false signal mimicking a true proximity or object detection signal. Representatively, in some cases, walls 109-111 may be formed by a stack up including a spacer layer 132 positioned on substrate 112, a lens support member 134 positioned over spacer layer 132 and another spacer layer 136 over lens support member 134. Openings similar to 114 and 116 may be formed through each of the layers prior to assembly so that first and second compartments 106, 108 are formed around emitter 102 and detector 104.

Spacer layer 132 may be positioned over substrate 112 and formed of a material which is substantially opaque to light, for example an epoxy resin. Spacer layer 136, which is formed over lens support member 134, may also be made of a material which is substantially opaque to light, for example an epoxy resin. In this aspect, spacer layers 132, 136, which form portions of mid wall 110, provide a light barrier between emitter 102 and detector 104.

Lens support member 134 may be made of a layer of material which is positioned over spacer layer 132. The material of lens support member 134 may be any material capable of mounting optical elements 118, 120 over spacer 132, and in turn emitter 102 and detector 104, respectively. Also, in some embodiments, lens support member 134 may be made of a material similar to that of substrate 112. Representatively, where substrate 112 is a PCB made of, for example, a composite material composed of woven glass fibers (e.g., an FR-4 grade glass-reinforced epoxy laminate sheet), lens support member 134 may also be made of the same composite material composed of woven glass fibers. It is recognized, however, that the presence of glass fibers between optical element 118 and optical element 120 may transmit light and provide a leakage path between emitter 102 and detector 104. In this aspect, to reduce such leakage (i.e. crosstalk), an orientation of the fibers within lens support member 134 may be configured to form a crosstalk controlling portion 130 between optical element 118 and optical element 120 which reduces crosstalk therebetween.

Figure 1B:
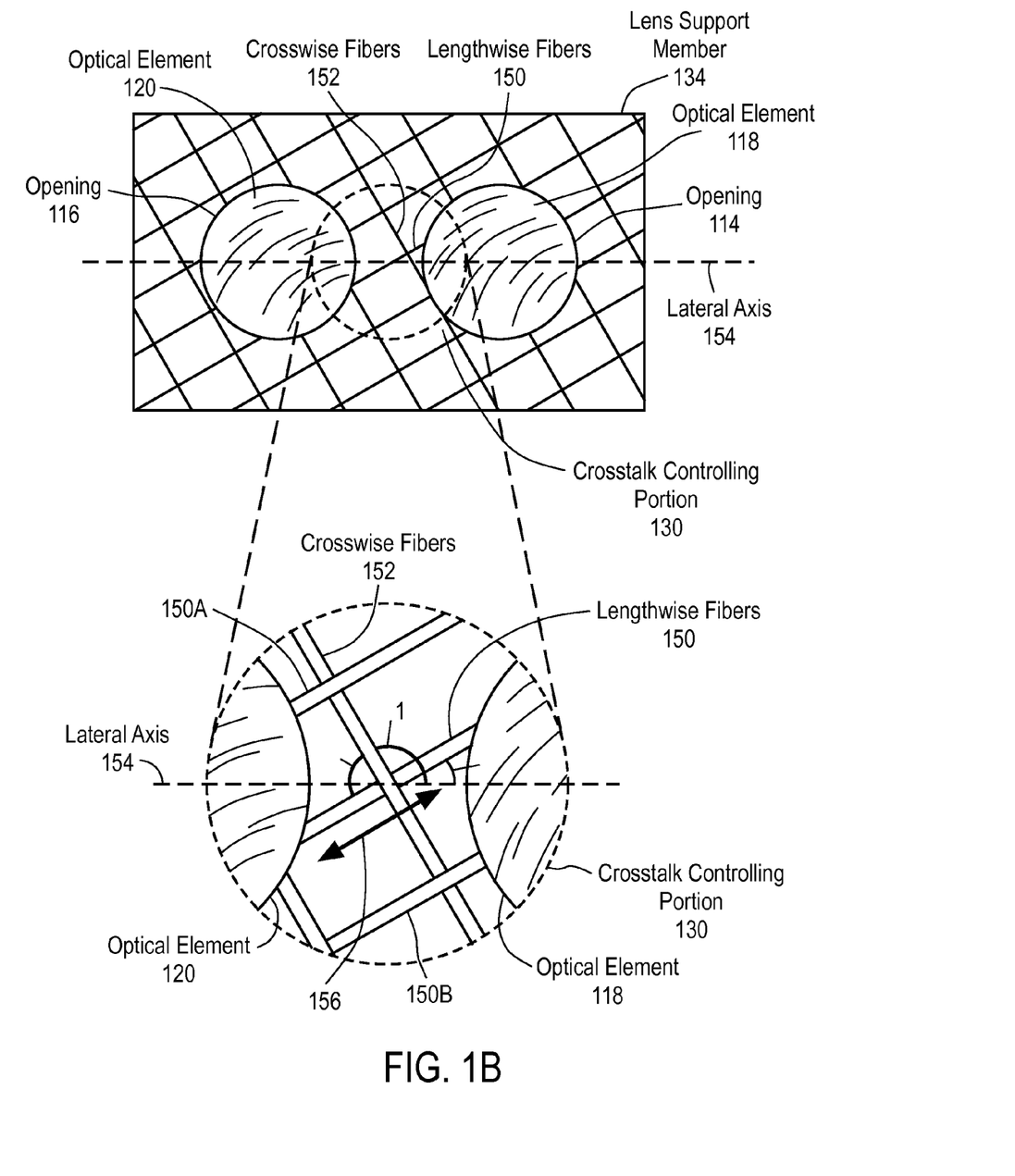
FIG. 1B is a top view of the sensing device of FIG. 1A.

A configuration of the fibers which form crosstalk controlling portion 130 can be more clearly seen in FIG. 1B. In particular, as can be seen from FIG. 1B, and more clearly in the magnified view of crosstalk controlling portion 130, lens support member 134 may be formed by a plurality of woven lengthwise fibers 150 and crosswise fibers 152. It is noted that although fibers 150 and 152 are referred to herein as "lengthwise" or "crosswise" fibers respectively, they are not necessarily orientated in a lengthwise or crosswise direction with respect to a length or width of lens support member 134. Rather, these terms are simply used to distinguish an orientation of one set of fibers (e.g., fibers 150) from an orientation of another set of fibers (e.g., fibers 152). Thus, in other embodiments, fibers 150 and fibers 152 could also be referred to using common weaving terminology to distinguish their different orientations, such as "warp" and "weft."

As can be seen from FIG. 1B, each of lengthwise fibers 150 are oriented substantially orthogonal to each of crosswise fibers 152 as illustrated by angle ($\alpha$). Because, in some cases, lengthwise fibers 150 and crosswise fibers 152 are glass fibers, light can travel along any one or more of the fibers having opposing ends terminating at optical element 118 and/or optical element 120. The transmission of stray light along the fibers in this manner may, in some cases, result in undesirable optical crosstalk between emitter 102 and detector 104. To reduce optical crosstalk between emitter 102 and detector 104 through the glass fibers, lengthwise fibers 150 and crosswise fibers 152 are oriented at a substantially non-orthogonal angle ($\beta$, $\beta_1$) to lateral axis 154, which bisects optical element 118 and optical element 120. In other words, lengthwise fibers 150 and crosswise fibers 152 are oriented in such a way that a direct light path between the optical elements and parallel to lateral axis 154 is avoided. For example, angles $\beta$ or $\beta_1$ of lengthwise fibers 150 and crosswise fibers 152, respectively, are between 0 and 90 degrees or 90 degrees and 180 degrees with respect to lateral axis 154.

Figure 1C:
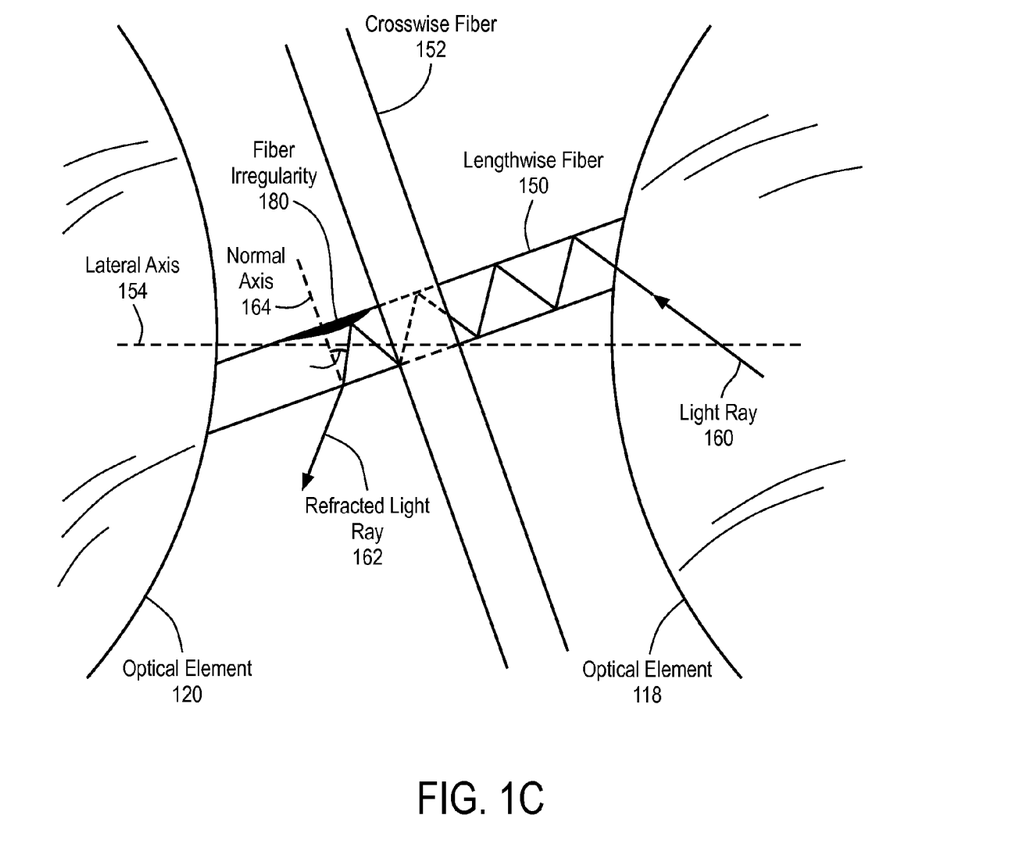
FIG. 1C is a perspective view of certain aspects of the sensing device of FIG. 1A.

Angling lengthwise fibers 150 and crosswise fibers 152 in this manner is believed to reduce optical crosstalk between emitter 102 and detector 104 due to an increased likelihood of light leakage from the fiber. In particular, as illustrated in the further magnified view of FIG. 1C, due to the angle of lengthwise fiber 150, light ray 160 enters lengthwise fiber 150 at a higher input angle which is closer to a total internal reflection (TIR) critical angle than would be the case if lengthwise fiber 150 were parallel to lateral axis 154. Since light ray 160 enters lengthwise fiber 150 at a much higher angle, light ray 160 will bounce off the walls of lengthwise fiber 150 due to TIR many times when traveling through fiber 150. Once light ray 160 strikes lengthwise fiber 150 at an angle of incidence ($\rho$) less than the TIR critical angle, such as may be the case when light ray 160 strikes an irregularity 180 (e.g., a bump) in the fiber shell, light ray 160 is no longer reflected within lengthwise fiber 150 and instead leaks out of the fiber as illustrated by refracted light ray 162. Such leakage is more likely to occur in cases where the input angle of the light ray is higher because in such cases the light ray (e.g., light ray 160) is reflected within the fiber at an angle closer to the TIR critical angle therefore relatively small reflection errors, such as that due to an irregularity or bump within the fiber, will result in an angle of incidence less than the TIR critical angle. In one embodiment, the angle of incidence ($\rho$) is less than 42 degrees with respect to normal axis 164. As a result, light ray 160, and any other light rays entering fiber 160 at a similarly high input angle and in turn striking irregularity 180, may contact the fiber wall at an angle less than the TIR critical angle and leak out of the fiber before reaching optical element 120.

Figure 1D:
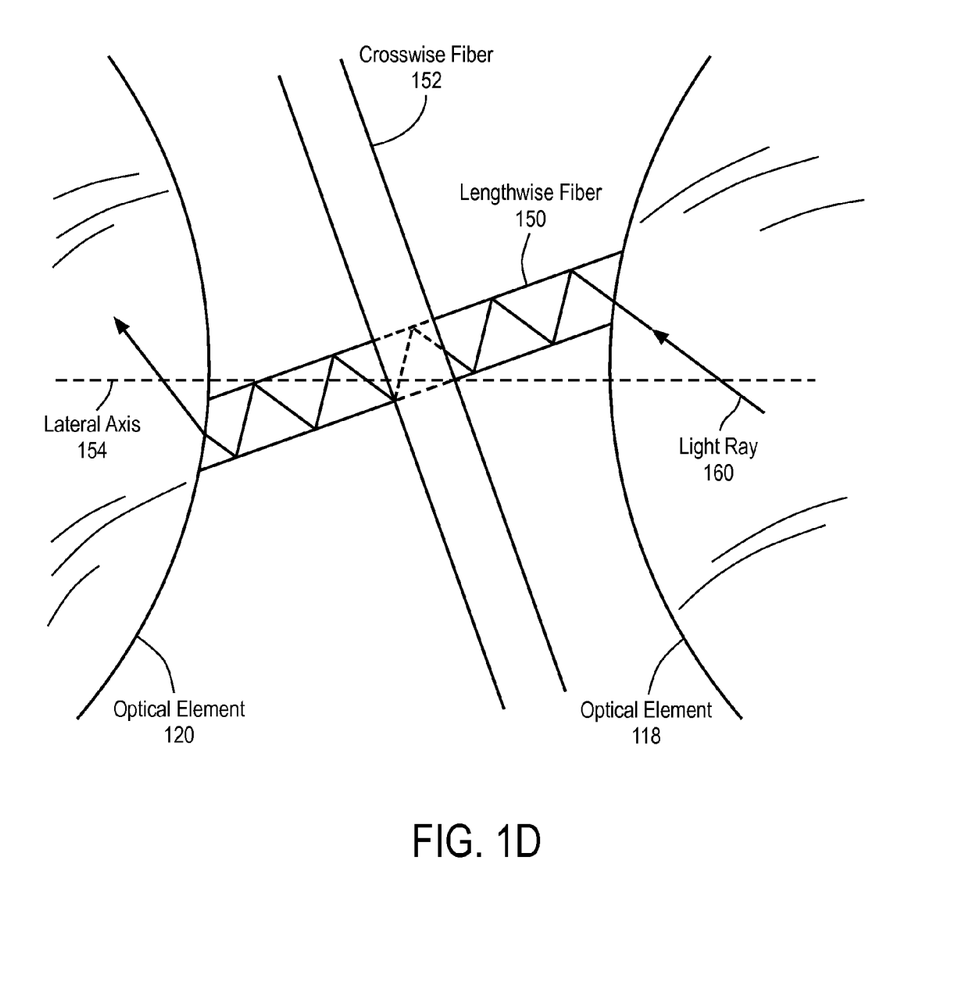
FIG. 1D is a perspective view of certain aspects of the sensing device of FIG. 1A.

In still further embodiments, it is believed that the angular orientation of lengthwise fibers 150 and crosswise fibers 152 may reduce crosstalk between emitter 102 and detector 104 by directing light that does travel along an entire length of the fiber away from the emitter 102 or detector 104 at a higher angle than would be the case if the fiber were oriented parallel to lateral axis 154. Representatively, as can be seen from FIG. 1D, when light ray 160 enters lengthwise fiber 150 at a higher angle due to the angled orientation of lengthwise fiber 150, it continues to travel along lengthwise fiber 150 at a relatively high angle. If light ray 160 does not leak out the side of lengthwise fiber 150 before reaching the end terminating at optical element 120, its output direction will typically be in a direction away from the corresponding detector 104 as illustrated by FIG. 1D. This is believed to occur because the input and output direction efficiencies of an angled lengthwise fiber 150 are not as favorable to crosstalk as a fiber parallel to lateral axis 154 would be.

Returning to FIG. 1B, it should also be noted that in addition to the increased light attenuation caused by the angled crosswise fibers 152 and lengthwise fibers 150 for the reasons previously discussed, such a non-orthogonal orientation may prevent, or reduce the number of, fibers extending between optical elements 118 and 120. For example, lengthwise fiber 150A is orientated in a direction away from optical element 118 and lengthwise fiber 150B is oriented in a direction away from optical element 120 therefore any light leakage through fibers 150A and 150B is not transmitted from one optical element to the other. In embodiments where one or more of the fibers do extend between optical elements 118 and 120, for example lengthwise fiber 150, the length of the optical path (as illustrated by arrow 156) between optical elements 118 and 120 is increased, as compared to a path length when the fiber is oriented parallel to lateral axis 154. It is believed that this increased length may also increase light attenuation along the fiber. It is believed that due to the longer path length, there is more opportunity for light leakage out a side of the fiber and therefore less of the light is transmitted between first compartment 106 and second compartment 108 in a direction of arrow 156.

Figure 1E:
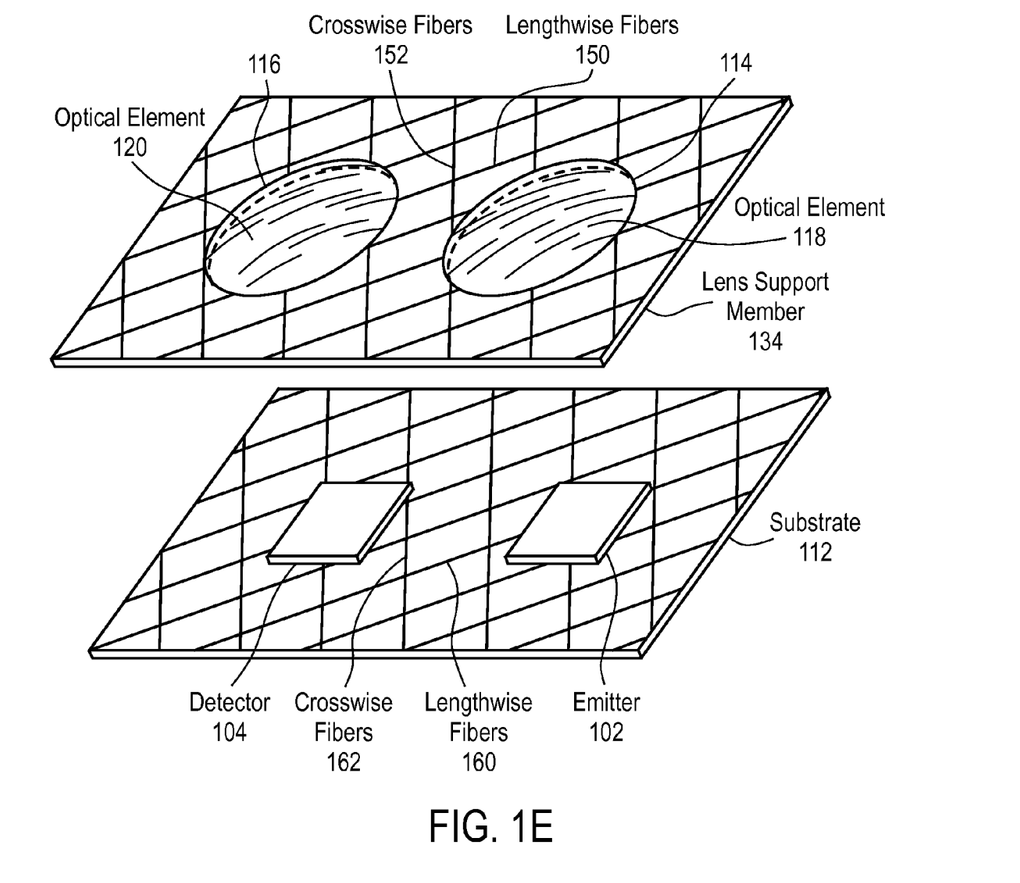
FIG. 1E is a perspective view of certain aspects of the sensing device of FIG. 1A.

Additionally, in cases where substrate 112 is made of the same woven material as lens support member 134, a fiber orientation within substrate 112 and lens support member 134 may be the same, as illustrated by FIG. 1E. Orienting the fibers of substrate 112 and lens support member 134 in a similar manner may help to maintain an alignment between optical elements 118, 120 and the underlying emitter 102 and detector 104, respectively. In particular, the coefficient of thermal expansion (COE) of each of lens support member 134 and substrate 112 may be affected by an orientation of the fibers. Thus, by orienting lengthwise fibers 150 and crosswise fibers 152 of lens support member 134 in a manner similar to lengthwise fibers 160 and crosswise fibers 162 of substrate 112, respectively, the layers will have a similar coefficient of thermal expansion. Since optical elements 118, 120 are mounted to lens support member 134 and emitter 102 and detector 104 are mounted to substrate 112, it is important that any movement due to an expansion of the layers be the same for each of these elements in order to maintain the proper alignment. The orientation of lengthwise fibers 150 and crosswise fibers 152 of lens support member 134 and lengthwise fibers 160 and crosswise fibers 162 of substrate 112 may be controlled by, for example, cutting lens support member 134 and substrate 112 from a sheet of woven material such that the edges of lens support member 134 and substrate 112 are cut at an angle with respect to the fibers running through the sheet, as opposed to cutting parallel to the fiber length. In this aspect, when the lens support member 134 and substrate 112 are assembled to form sensing device 100, any lengthwise fibers and the crosswise fibers between optical elements 118 and 120 will be at an angle with respect to lateral axis 154.

Figure 2A:
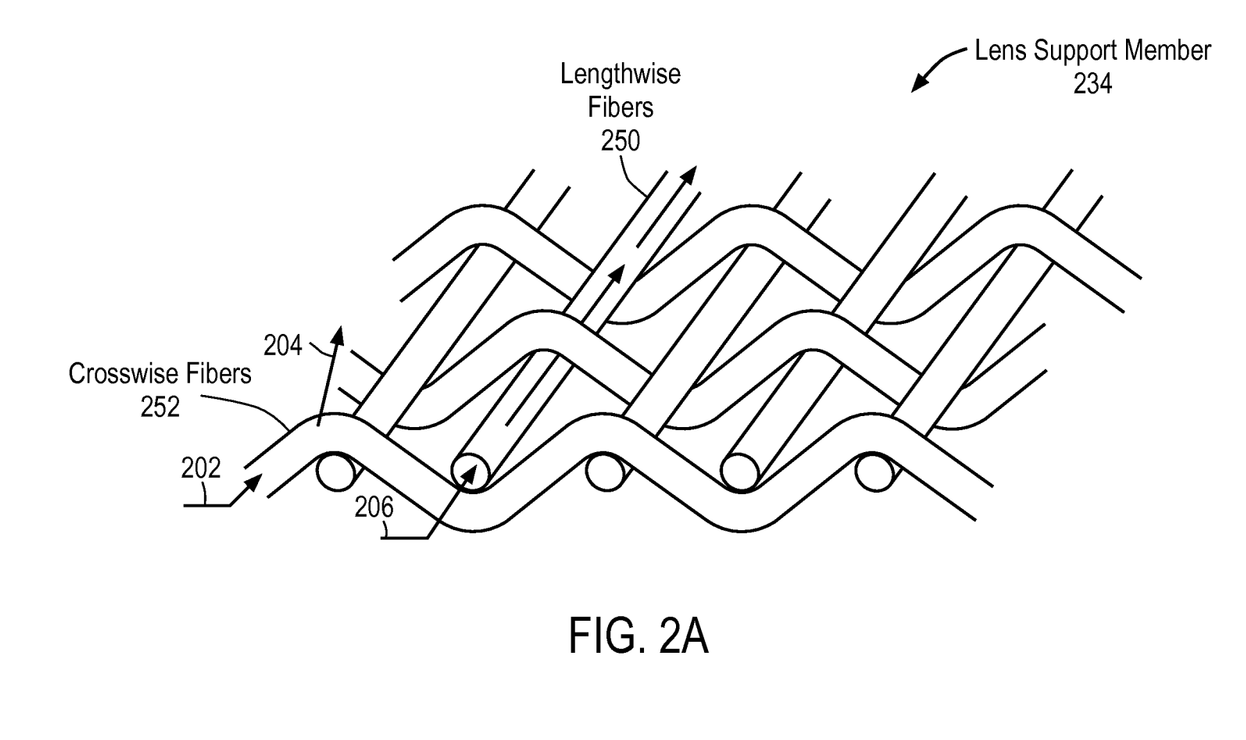
FIG. 2A is a perspective magnified view of an aspect of a lens support member of a sensing device.

FIG. 2A illustrates a magnified view of one embodiment of a portion of lens support member used to mount optical elements to the sensing device. From this view, it can be seen that in some embodiments, crosswise fibers 252 may have a greater radius of curvature than lengthwise fibers 250. In particular, crosswise fibers 252 may be woven through a series of lengthwise fibers 250, which are held "in tension" during the weaving process and are therefore substantially straight. The radius of curvature of crosswise fibers 252 may be sufficient to allow a light ray 202 entering one or more of crosswise fibers 252 from the associated emitter or detector to leak or refract from the fiber into the surrounding material in a direction of arrow 204. The refracted light ray can, in some cases, then be absorbed into the epoxy matrix of spacer layer 132 or spacer layer 136. Transmission of the light along the fiber length to the emitter or detector is in turn reduced. This is in comparison to light ray 206 which would be transmitted substantially along a length of one of lengthwise fibers 250 and exit the fiber at its end (e.g., into the first or second compartment 106, 108 depending upon its orientation).

Figure 2B:
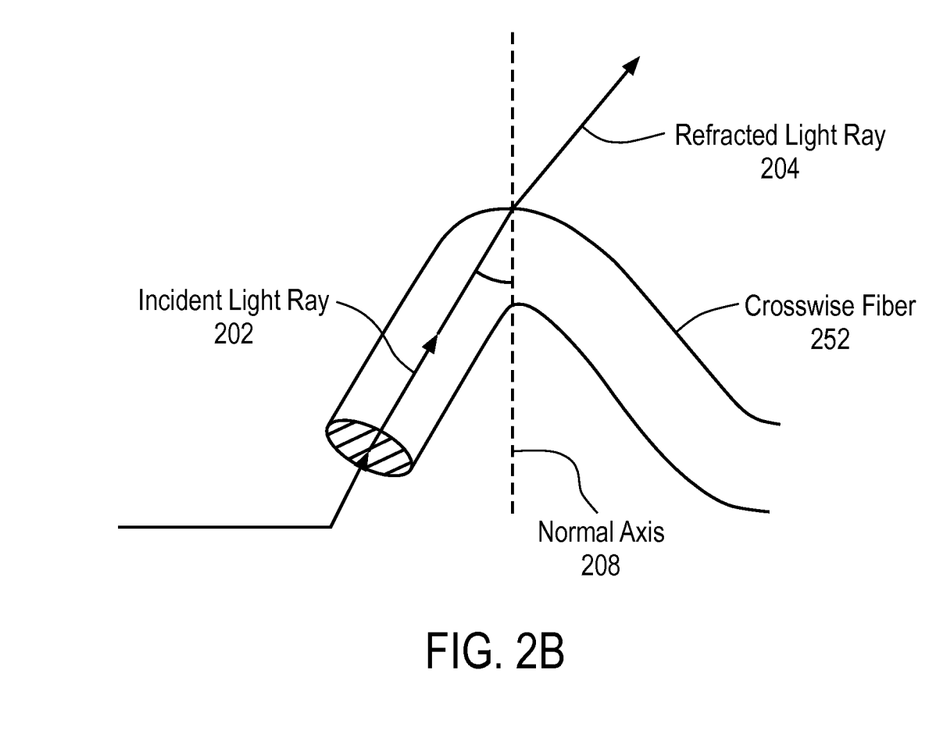
FIG. 2B is a perspective magnified view of an aspect of the lens support member of FIG. 2A.
Figure 2C:
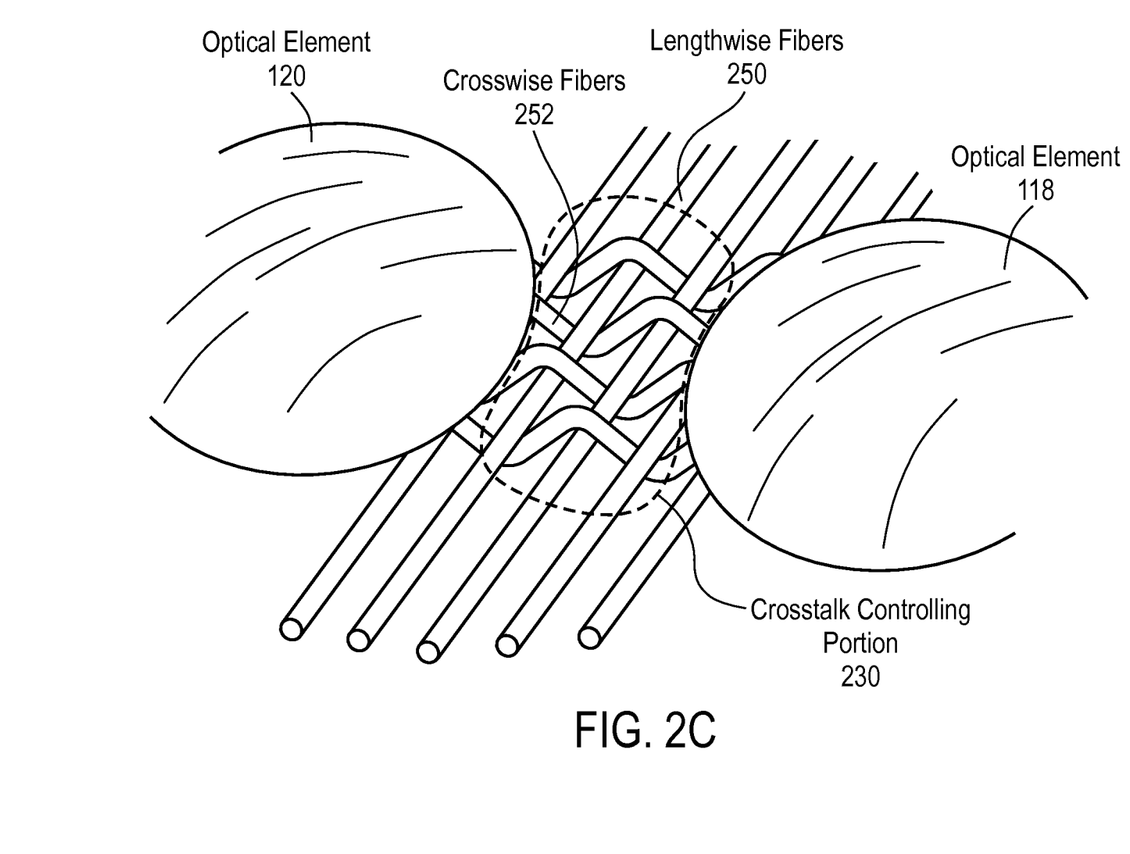
FIG. 2C is a perspective view of an aspect of the lens support member of FIG. 2A.

As illustrated in more detail in reference to FIG. 2B, the refraction of light ray 202 out of crosswise fiber 252 may occur where the radius of curvature of crosswise fiber 252 is such that light ray 202 strikes crosswise fiber 252 at an angle of incidence (A) less than an angle sufficient to cause total internal reflection (TIR) within crosswise fiber 252. In one embodiment, angle of incidence (A) is less than 42 degrees with respect to normal axis 208. Thus, where incident light ray 202 strikes crosswise fiber 252 at an angle of incidence less than 42 degrees, refracted light ray 204 is transmitted out of crosswise fiber 252, away from optical elements 118, 120. Thus, in some embodiments, crosstalk between emitter 102 and detector 104 can be reduced by orienting lens support member 234 such that the set of fibers (e.g., crosswise fibers 252) having a greater radius of curvature than the other set of fibers (e.g., lengthwise fibers 250) within the crosstalk controlling portion 230 are oriented in a direction of optical elements 118, 120 as illustrated in FIG. 2C.

Figure 3:
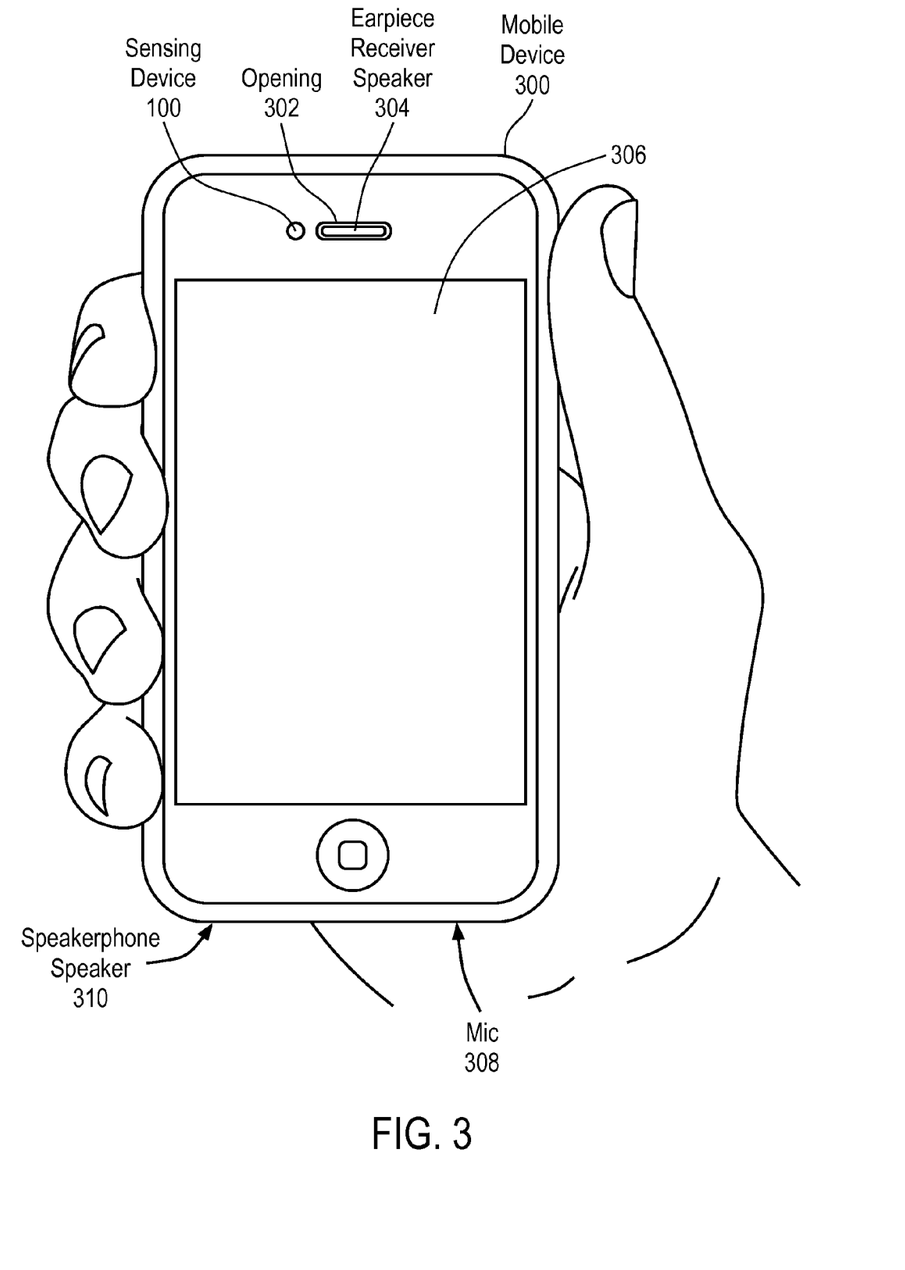
FIG. 3 is a perspective view of a handheld device within which embodiments of a sensing device may be implemented.

Turning now to FIG. 3, this figure depicts an example embodiment of a portable handheld device 300 having a sensing device 100 implemented therein. In this illustration, a near end user is holding the device 300 in their hand. Sensing device 100 may be positioned within an outer casing of handheld device 300 near a front face of handheld device 300 so that it can sense a proximity of a user when the user draws the phone toward their face. It is contemplated, however, that sensing device 100 may be associated with other portions of handheld device 300, for example, a bottom, a top or a side portion of handheld device 300. Handheld device 300 may further include an opening 302 near the front face that is associated within an earpiece receiver 304.

Handheld device 300 may include various capabilities to enable the user to access features involving, for example, calls, text messages, voicemail, e-mail, the Internet, scheduling, photos, and music as shown on the touch screen display 306. In addition, handheld device 300 may include a microphone 308 and speakerphone speaker 310 to allow for input and/or output of audio signals to and from handheld device 300. When the user holds the handheld device 300 to their head during a call in, for example, the device handset mode, the earpiece receiver speaker 304 (which may be located at a top end portion of the handheld device 300) may be positioned against the user's ear. In that case, the sensing device 100 is situated in the general direction of the user. The emitter 102 within device 100 emits, for example, an IR light beam through the front face of device 100 (which may be formed by a transparent window). The light beam is then reflected off of the user, and a based on the intensity of the beam, handheld device 300 can determine a proximity of the user, and for example, disable the touch screen display 306 when the device 300 is determined to be close to the user's face. In addition, in embodiments where sensing device 100 includes an ALS function, when sensing device 100 detects a relatively low ambient light intensity level, the display lighting may be reduced, for example, to conserve battery power.

It is to be understood that although a handheld device such as an iPhone® from Apple Computer, Inc. of Cupertino, Calif., is illustrated in FIG. 3, sensing device 100 may be implemented within any number of electronic devices that could benefit from a light and proximity sensing device. For example, sensing device 100 may be implemented within a tablet computer, a notebook computer or other portable computing device. In still further embodiments, sensing device 100 may be implemented within a digital media player, such as a portable music and/or video media player, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 4:
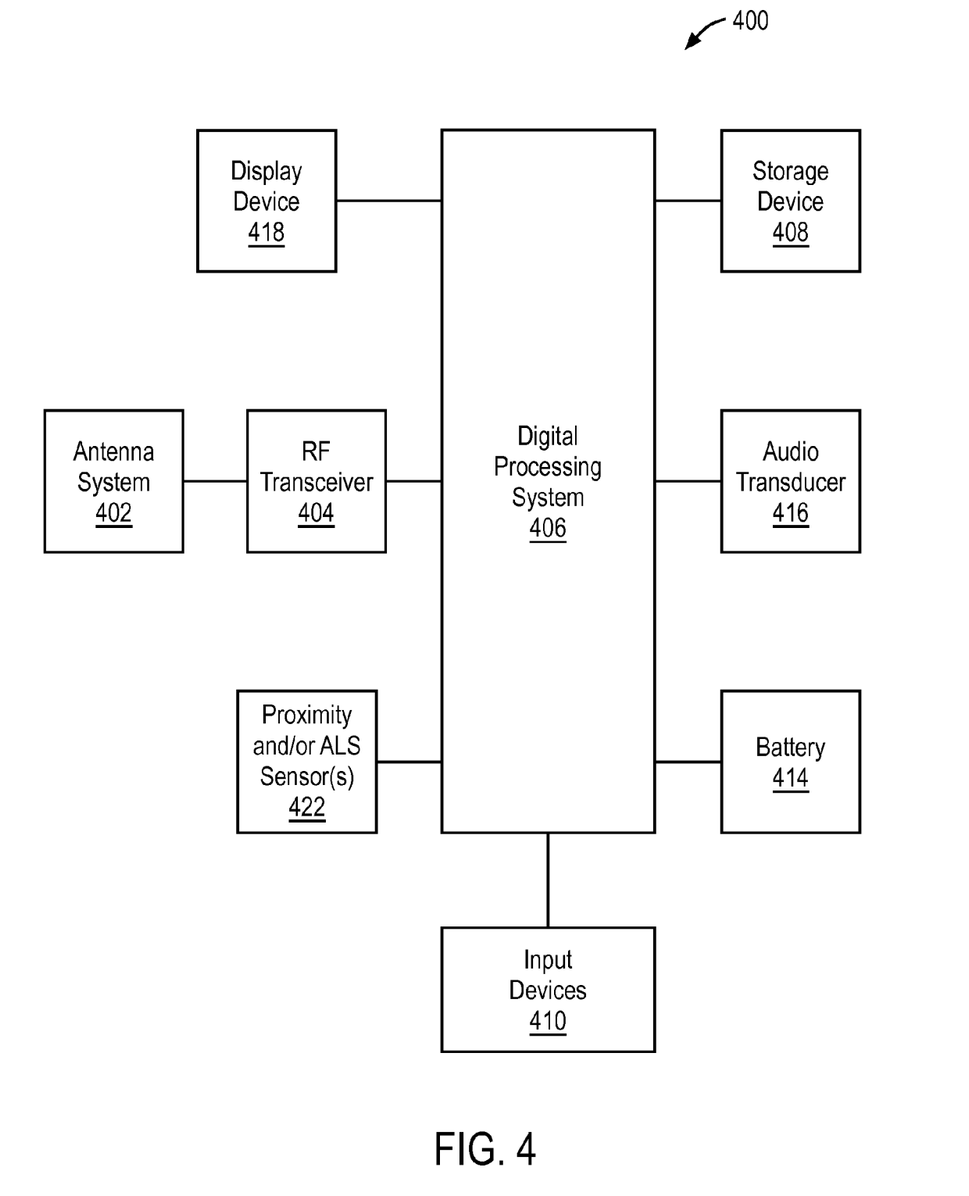
FIG. 4 is a block diagram of a system in which embodiments of a sensing device may be implemented.

FIG. 4 shows a block diagram of an embodiment of a device 400 within which sensing device 100 may be implemented. In the illustrated embodiment, device 400 is a wireless communication device. The wireless device 400 may be included in the device shown in FIG. 3, although alternative embodiments of handheld device 300 may include more or fewer components than the wireless device 400.

Wireless device 400 may include an antenna system 402. Wireless device 400 may also include a radio frequency (RF) transceiver 404, coupled to the antenna system 402, to transmit and/or receive voice, digital data and/or media signals through antenna system 402.

A digital processing system 406 may further be provided to control the digital RF transceiver and to manage the voice, digital data and/or media signals. Digital processing system 406 may be a general purpose processing device, such as a microprocessor or controller for example. Digital processing system 406 may also be a special purpose processing device, such as an ASIC (application specific integrated circuit), FPGA (field-programmable gate array) or DSP (digital signal processor). Digital processing system 406 may also include other devices to interface with other components of wireless device 400. For example, digital processing system 406 may include analog-to-digital and digital-to-analog converters to interface with other components of wireless device 400.

A storage device 408, coupled to the digital processing system, may further be included in wireless device 400. Storage device 408 may store data and/or operating programs for the wireless device 400. Storage device 408 may be, for example, any type of solid-state or magnetic memory device.

One or more input devices 410, coupled to the digital processing system 406, to accept user inputs (e.g., telephone numbers, names, addresses, media selections, etc.) or output information to a far end user may further be provided. Exemplary input devices may be, for example, one or more of a keypad, a touchpad, a touch screen, a pointing device in combination with a display device or similar input device.

Display device 418 may be coupled to the digital processing system 406, to display information such as messages, telephone call information, contact information, pictures, movies and/or titles or other indicators of media being selected via the input device 410. Display device 418 may be, for example, an LCD display device. In one embodiment, display device 418 and input device 410 may be integrated together in the same device (e.g., a touch screen LCD such as a multi-touch input panel which is integrated with a display device, such as an LCD display device). It will be appreciated that the wireless device 400 may include multiple displays.

Battery 414 may further be provided to supply operating power to components of the system including digital RF transceiver 404, digital processing system 406, storage device 408, input device 410, audio transducer 416, proximity and/or ALS sensors 422 (e.g., sensing device 100), and display device 418. Battery 414 may be, for example, a rechargeable or non-rechargeable lithium or nickel metal hydride battery. Wireless device 400 may also include audio transducers 416, which may include one or more speakers, receivers and at least one microphone.

Proximity and/or ALS sensor(s) 422 may be coupled to the digital processing system 406. The proximity and/or ALS sensor(s) 422 may include, for example, one or more of a light and/or proximity sensor (e.g., sensing device 100). Based on the data acquired by the proximity and/or ALS sensor(s) 422, various responses may be performed automatically by the digital processing system, such as, for example, activating or deactivating the backlight, changing a setting of the input device 410 (e.g., switching between processing or not processing, as an intentional user input, any input data from an input device), and other responses and combinations thereof. It is noted that other types of sensors may also be included in wireless device 400, such as an accelerometer, touch input panel, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof.

More specifically, proximity and/or ALS sensor(s) 422 may include one or more ALS or proximity sensor(s) (e.g., sensing device 100) which provide data relating to light. The data can be analyzed by digital processing system 406 to determine whether or not to adjust one or more settings of wireless device 400. Ambient light level data may be provided by an ambient light sensor feature of sensing device 100, which indicates the level of light intensity surrounding that sensor. For example, ambient light differential data may be obtained from two or more ambient light sensors which are disposed at different positions on the device. For example, one ambient light sensor may be on one side of the device, and another ambient light sensor may be on another side of the device. A difference in the light intensity levels may be determined by comparing the data from these two ambient light sensors on two different sides or surfaces of the device.

There are a variety of possible uses of a light sensor. For example, the light sensor may be used with a proximity sensor to determine when a device is placed in a pocket to cause the device to be set in vibrate mode only or vibrate mode with audible ringing. In another example, in response to a light sensor determining that the ambient light is very low, and optionally in response to a user having set the device to visibly light up to show an incoming call when the ambient light is very low, the device may automatically be put in a "light ring" mode when it is dark so that instead of an audible ring from the device, the display flashes visibly (e.g., by repeatedly turning on and off the backlight) to indicate an incoming call. Another exemplary use of a light sensor involves using it as an alarm indicating that a dark room (or environment) has become brighter (e.g., the sun has risen or a door to a darkened room is opened to let light into the room). A light sensor may also be used to cause a device to automatically act as a source of light (e.g., as a flashlight, in effect) upon sensing a low ambient light level.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although portable handle held devices are described herein, it is contemplated that sensing device may be implemented in other types of devices including, but not limited to, a desk top computer, television or the like. The description is thus to be regarded as illustrative instead of limiting.

What is claimed is:

1. A proximity sensing apparatus comprising:
   a light emitting assembly having a light emitting device for proximity sensing positioned on a substrate and a light emitting lens that is positioned along a side of the light emitting device that is opposite the substrate, the light emitting lens capable of transmitting light from the light emitting device to an ambient environment;
   a light receiving assembly having a light receiving device positioned on the substrate and a receiving lens positioned along a side of the light receiving device opposite the substrate, the light receiving lens capable of collecting light and transmitting the light toward the light receiving device; and
   a mid wall positioned between the light emitting assembly and the light receiving assembly, the mid wall having a crosstalk controlling portion positioned between the light emitting lens and the light receiving lens, the crosstalk controlling portion having a plurality of lengthwise fibers and a plurality of crosswise fibers oriented substantially orthogonal with respect to one another and at a substantially non-orthogonal angle with respect to a lateral axis bisecting the light emitting lens and the light receiving lens.

2. The apparatus of claim 1 wherein the substrate comprises a material having a plurality of lengthwise fibers and a plurality of crosswise fibers oriented in substantially the same direction as the lengthwise fibers and crosswise fibers of the crosstalk controlling portion, respectively, such that a coefficient of thermal expansion of the substrate and the crosstalk controlling portion are substantially the same.

3. The apparatus of claim 1 wherein the substrate and the crosstalk controlling portion comprise an FR4 grade glass-reinforced epoxy laminate.

4. The apparatus of claim 1 wherein the substrate is a printed circuit board (PCB).

5. The apparatus of claim 1 wherein one of the plurality of crosswise fibers or the plurality of lengthwise fibers have a greater radius of curvature than the other and are oriented in a direction of the light emitting lens and the light receiving lens.

6. The apparatus of claim 5 wherein the greater radius of curvature is sufficient to cause light to leak out of the fibers so as to reduce transmission of the light from one end of the fibers to the other end.

7. The apparatus of claim 5 wherein the greater radius of curvature is such that the light entering the fibers strikes the fibers at an angle of incidence less than an angle sufficient to cause total internal reflection (TIR) within the fibers.

8. A proximity sensing apparatus comprising:
a light emitting compartment having a light emitter for proximity sensing positioned on a substrate and an emitter optical element positioned along a side of the light emitter that is opposite the substrate;
a light receiving compartment having a light detector positioned on the substrate and a detector optical element positioned along a side of the light detector that is opposite the substrate;
an optical element support member dimensioned to support the emitter optical element and the detector optical element above the substrate, the optical element support member having a crosstalk controlling portion between the emitter optical element and the detector optical element, the crosstalk controlling portion capable of redirecting light entering the crosstalk controlling portion from the light emitting compartment or the light detecting compartment at an angle with respect to a lateral axis bisecting the emitter optical element and the detector optical element.

9. The apparatus of claim 8 wherein the crosstalk controlling portion comprises a plurality of lengthwise fibers and a plurality of crosswise fibers oriented at a substantially non-orthogonal angle with respect to the lateral axis.

10. The apparatus of claim 9 wherein one of the plurality of crosswise fibers or the plurality of lengthwise fibers have a greater radius of curvature than the other and are oriented in a direction of the emitter optical element and the detector optical element, wherein the greater radius of curvature is such that the light entering the fibers strikes the fibers at an angle of incidence less than an angle sufficient to cause total internal reflection (TIR) within the fibers.

11. The apparatus of claim 8 wherein each of the substrate and the crosstalk controlling portion comprise a material woven from glass fibers and wherein the glass fibers of each of the substrate and the crosstalk controlling portion are oriented in substantially the same manner such that a coefficient of thermal expansion of the substrate and the crosstalk controlling portion are substantially the same.

12. The apparatus of claim 8 wherein the substrate and the crosstalk controlling portion comprise an FR4 grade glass-reinforced epoxy laminate.

13. A proximity sensing apparatus comprising:
a printed circuit board (PCB) having operatively mounted thereto a light emitter and a light detector for proximity sensing;
a spacer member positioned over the PCB, the spacer member dimensioned to form a first compartment around the light emitter and a second compartment around the light detector; and
a lens support member positioned over the spacer member, the lens support member having a first opening for receiving and aligning a first lens element over the light emitter and a second opening for receiving and aligning a second lens element over the light detector, the lens support member and the PCB being formed by a woven material having a substantially similar weave orientation such that a coefficient of thermal expansion of the lens support member and the PCB are substantially similar, and
wherein the weave orientation of the lens support member is configured to reduce an optical crosstalk between the first compartment and the second compartment.

14. The apparatus of claim 13 wherein the lens support member comprises a plurality of lengthwise fibers and a plurality of crosswise fibers oriented at a substantially non-orthogonal angle with respect to a lateral axis bisecting the first opening and the second opening.

15. The apparatus of claim 14 wherein one of the plurality of crosswise fibers or the plurality of lengthwise fibers have a greater radius of curvature than the other and are oriented in a direction of the first opening and the second opening, wherein the greater radius of curvature is sufficient to cause light to leak out of the fibers so as to reduce transmission of the light between the light emitter and the light detector.

16. The apparatus of claim 13 wherein the PCB and the lens support member comprise an FR4 grade glass-reinforced epoxy laminate.

* * * * *